(12) United States Patent
Sultana et al.

(10) Patent No.: US 8,638,672 B2
(45) Date of Patent: Jan. 28, 2014

(54) METHODS AND APPARATUS FOR DETECTING ERRORS IN ENCODING AND DECODING OF DATA

(75) Inventors: George Sultana, Wayside, NJ (US);
Robert J. Ferro, Jackson, NJ (US);
Prasad Reddy Gujju, Grapevine, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 916 days.

(21) Appl. No.: 11/958,663

(22) Filed: Dec. 18, 2007

(65) Prior Publication Data

US 2009/0154539 A1 Jun. 18, 2009

(51) Int. Cl.
*G06F 11/00* (2006.01)
(52) U.S. Cl.
USPC .............. 370/242; 370/476; 714/819
(58) Field of Classification Search
None
See application file for complete search history.

(56) References Cited

U.S. PATENT DOCUMENTS

| | | | | |
|---|---|---|---|---|
| 6,788,315 | B1* | 9/2004 | Kekic et al. | 715/733 |
| 7,181,677 | B1* | 2/2007 | Weng | 714/784 |
| 7,363,545 | B1* | 4/2008 | Jacobson et al. | 714/39 |
| 7,567,897 | B2* | 7/2009 | Halcrow et al. | 704/201 |
| 2002/0145985 | A1* | 10/2002 | Love et al. | 370/328 |
| 2006/0031905 | A1* | 2/2006 | Kwon | 725/108 |
| 2007/0201462 | A1* | 8/2007 | Ilan | 370/389 |

* cited by examiner

*Primary Examiner* — Chi Pham
*Assistant Examiner* — Mohammad Adhami

(57) ABSTRACT

Systems and techniques for improved error detection in data communication. A sending station encodes unencoded data to create an encoded message and passes the encoded data to transmission elements for transmission to a destination receiver. At the same time, error detection is performed using copies of the unencoded data and the encoded message. The encoded message is decoded using a decoding procedure identical to that to be used by the destination receiver. The copy of the unencoded data is compared to the decoded copy of the encoded message, and if the copy of the unencoded data does not match the decoded copy, the presence of an error is identified and error recovery procedures are performed.

20 Claims, 2 Drawing Sheets

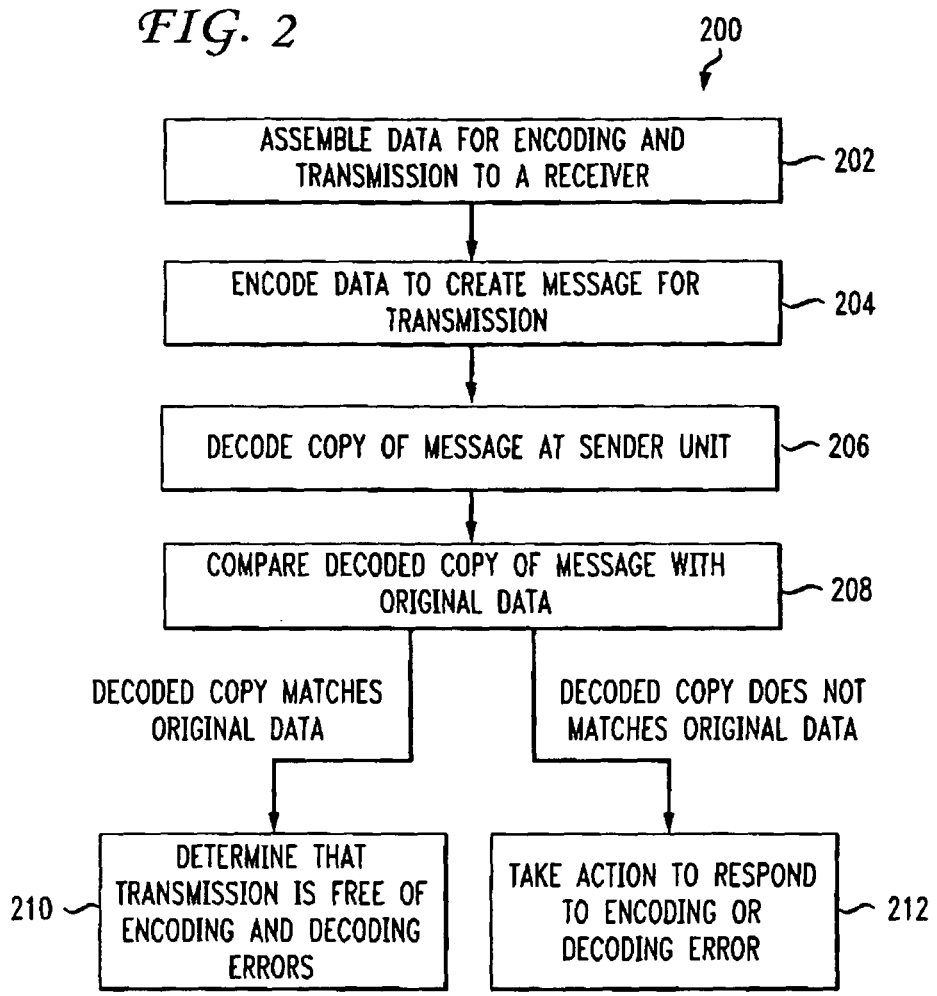

though the original data does not match, a determination is made that errors took place and appropriate action is taken, such as reporting or troubleshooting the errors, or sending the message again.

METHODS AND APPARATUS FOR DETECTING ERRORS IN ENCODING AND DECODING OF DATA

FIELD OF THE INVENTION

The present invention relates generally to improvements to data communication. More particularly, the invention relates to improved systems and techniques for detecting the occurrence of errors in encoding and decoding of data during a data transmission process.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a process of communication according to an aspect of the present invention.

BACKGROUND OF THE INVENTION

Figure 1:
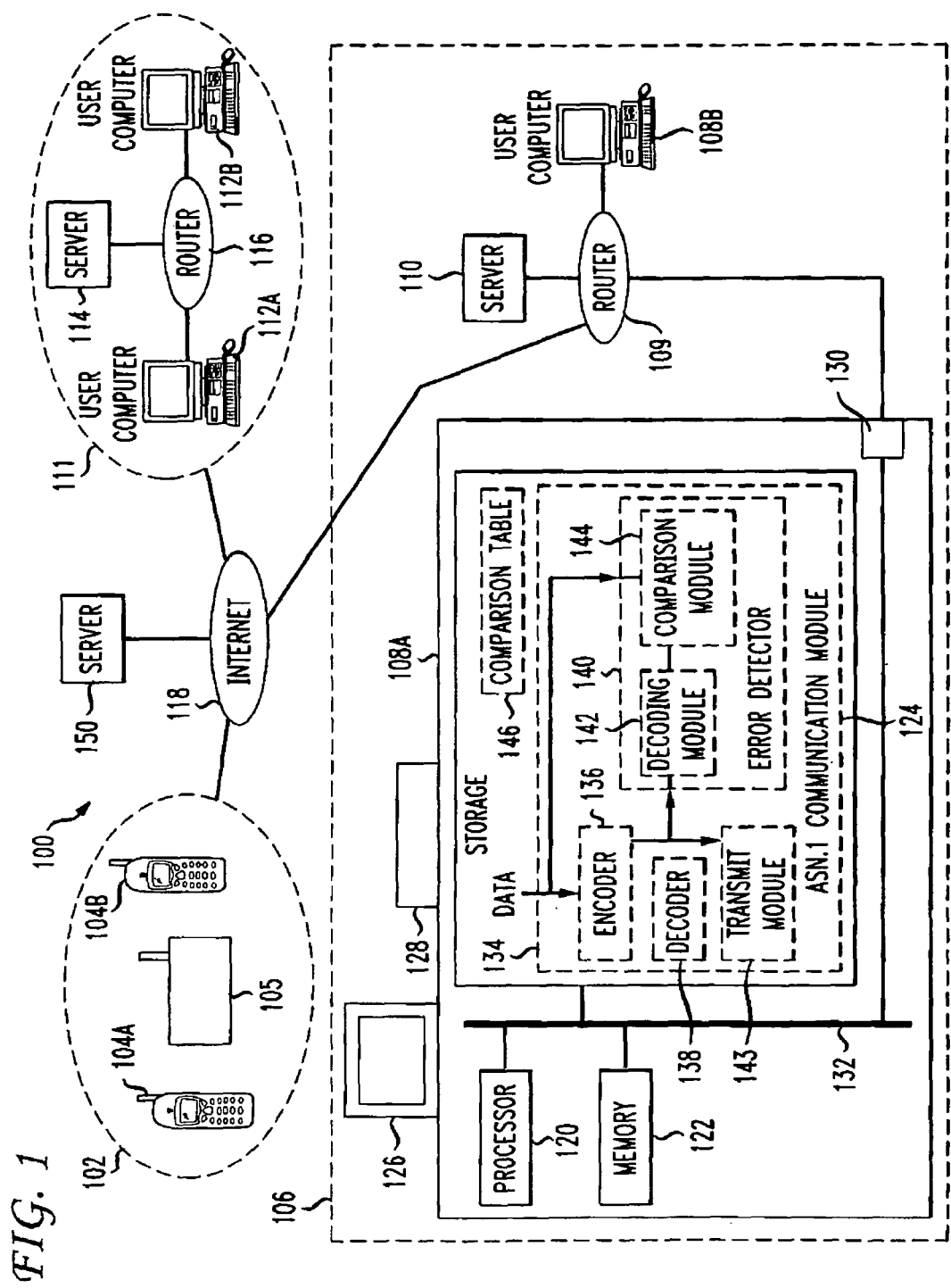
FIG. 1 illustrates a communication system according to an aspect of the present invention.

The operation of modern society depends on the transmission of huge volumes of information from sources to remote receivers. Much of this information is transmitted in binary form, with most of the data being encoded according to one format or standard or another for transmission. Encoding can provide for bandwidth conservation, data encryption, error recognition and correction, and a number of additional advantages.

DETAILED DESCRIPTION

FIG. 1 illustrates a communication system according to an aspect of the present invention. The system 100 includes a number of different communication networks, such as a cellular telephone network 102, including cellular telephones 104A and 104B and central station 105, as well as computer network 106, including user computers 108A and 108B, router 109, and central server 110, and computer network 111, including user computers 112A and 112B, a server 114, and router 116. The telephone network 102 and the computer networks 106 and 111 all have access to the Internet 118. Each of the various devices included in the system implements an encoder and a decoder supporting Abstract System Notation One (ASN.1) communication, but only the computer 108A will be described in detail here, in order to avoid repetitive description.

One particularly useful practice that is often employed in various transmission procedures is to send messages without requiring a response from a receiver. Such a practice simplifies data transmission because there is no need to wait for an acknowledgement and because there is no need to devote resources to sending, receiving, and recognizing an acknowledgement. However, such techniques increase the difficulty of recognizing errors because a sender of data has no way to know if the data was received correctly.

SUMMARY OF THE INVENTION

Among its several aspects, the present invention recognizes that recognition of possible sources of error and avoidance and correction of errors is important in any data transmission system, particularly a system which does not depend on acknowledgements from a receiver to a sender. The invention also recognizes that encoding and decoding systems contribute possible sources of error, and provides for systems and techniques for a sender to recognize when a message has been affected by encoding or decoding errors.

The computer 108A includes a processor 120, memory 122, and long term storage 124, as well as a display 126 and keyboard 128 and a network interface 130, all communicating over a bus 132. The computer 108A implements various software elements for processing and communicating data. Particularly relevant of these to the discussion of the present invention is an ASN.1 communication module 134. The ASN.1 communication module 134 is implemented as software stored on the long term storage 124. The ASN.1 communication module 134, or elements thereof, are transferred to memory 122 as needed for execution by the processor 120. The ASN.1 communication module 134 receives data to be transmitted and encodes the data into messages addressed to the destination receiver to which they are to be sent, typically in the form of simple network management protocol (SNMP) protocol data units (PDUs). The ANS.1 communication module 134 may also be designed so as to decode messages received from other devices which are part of the system 100. The computer 108A and other devices making up the system 100 may suitably both send and receive messages, encoding messages for transmission and decoding received messages. It will be recognized, however, that a computer such as the computer 108A, or other sender, may employ the teachings of the present invention without any receiving capability, and that the sending and receiving capability described herein is exemplary and may be implemented in numerous different ways. In addition, while the ASN.1 communication standard is discussed here by way of example, the teachings of the present invention may be employed with any suitable system or method of data encoding.

According to one aspect of the invention, a data communication system provides for one or more senders and one or more receivers communicating over a network or a plurality of networks. If desired, one or more senders may also function as receivers and one or more receivers may also function as senders. Each sender encodes messages according to an encoding standard and transmits messages to receivers. Each receiver decodes the message, using the same encoding standard employed by the sender.

In order to detect encoding or decoding errors, each sender implements a decoder operating in an identical fashion to encoders implemented in a receiver with which the sender communicates. The encoders and decoders are suitably implemented as software modules stored in and executed by data processing hardware included in the senders and receivers. Each sender therefore duplicates the encoding and decoding process that takes place during transmission of a message to a receiver. As the sender encodes a message and transmits it to a receiver, the sender also passes the data to its own decoder. The decoder operates on the message to produce a copy of the original data as it existed before encoding. The sender compares the original data to the copy produced by the decoder. If the original data matches the copy, a determination is made that no errors took place during encoding or decoding.

The ASN.1 communication module 134 includes an encoder 136, a decoder 138, and an encoding and decoding error detector 140. The encoding and decoding error detector 140 includes its own decoding module 142, operating in an identical fashion to a decoder used by a receiver of the message. In many cases, the decoding module 142 will operate in the same fashion as does the decoder 138, but if desired, the decoding module 142 may be designed so as to emulate a variety of different decoders, in order to adapt to different implementations of ASN.1 decoding that may be used by different receivers with which the computer 108A communicates. The various devices 104A, 104B, 108A, 108B, 112A, and 112B all suitably implement the same encoding and decoding standards, but the various implementations may be subject to variations due to bugs, errors, and misinterpretations of encoding and decoding standards, as well as other errors and variations, in encoding and decoding software. Systems and techniques according to an aspect of the present invention, described below using the computer 108A as an example, provide for detection of the occurrence of encoding or decoding errors affecting a particular unit of data to be transmitted, with the detection being able to be carried out at the sending unit.

When the computer 108A transmits a message to a receiver, the data to be transmitted is passed to the ASN.1 communication module 134, which prepares a message for transmission. The message is prepared bypassing the data to be transmitted to the encoder 136, which encodes the data into a message and passes it to a transmit module 143. The transmit module 143 adds appropriate address information and passes the message to the network interface 130.

At the same time that the data to be transmitted is passed to the encoder 136, it is also passed to the error detector 140. The encoder 136 also passes the encoded message to the error detector 140. The error detector 140 passes the encoded message received from the encoder 136 to a comparison module 144. The error detector passes the encoded message to the decoding module 142, along with any information indicating the particular decoding procedure or standard to be followed. Such information may include information identifying the receiver, such as address or destination information, or information identifying a particular remote system or network to which the message is to be directed. For example, if the destination is in a cellular telephone network, and all entities in the network employ the same ASN.1 decoding procedure, identifying the network can provide sufficient information to identify the decoding procedure to be used. Alternatively, the specific decoding procedure may be identified, the destination address may be provided, or similar information may be used to identify the decoding procedure.

To this end, the error detector 140 may include a correlation table 146, which receives information identifying the destination network, specific destination, decoding procedure, or similar information, and provides this information to the decoding module 142. The decoding module 142 decodes the message according to the decoding procedure to be used at the destination, and the decoded message is passed to the comparison module 144. The decoded message and the original data passed to the error detector are then passed to the comparison module 144. After encoding and decoding, the message should match the original data, and if the comparison module determines that the original data matches the encoded and decoded message, the transmission is presumed to be free of encoding and decoding errors. If the original data does not match the encoded and decoded message, an encoding or decoding error has occurred, and appropriate action is taken, such as initiation of an error recovery process, a report of the error, updating of error statistics, or any other appropriate action or combination of actions. One possible source of encoding or decoding errors may be programming errors in encoders or decoders, or misinterpretations of encoding standards in encoders or decoders. Maintaining encoding and decoding error statistics helps in determining when encoder and decoder updates should be undertaken, and the computer 108A and other devices in the system 100 may advantageously compile error statistics and periodically report the statistics to an appropriate recipient, such as a server 150. The server 150 may be maintained by a standards agency or other entity, which may update encoding and decoding software as appropriate, or may periodically pass collections of error statistics to developers or users of encoding and decoding software, in order to provide them with useful information for improvements to the software.

FIG. 2 illustrates a process 200 of data communication according to an aspect of the present invention. At step 202, data is assembled for encoding and transmission to a receiver. At step 204, the data is encoded for transmission, creating a message to be directed to a destination. At step 206, the encoded data is decoded by the sending unit, in order to create a copy of the original data as it exists after encoding and decoding for detection of encoding and decoding errors. The step of decoding may include examining information indicating the decoding procedure to be used, such as receiver address, identity of the network to which the receiver belongs, or the like, in order to accommodate variations in decoding that may be employed by different receivers. At step 208, the decoded data is compared with the original data. If the decoded data matches the original data, process proceeds to step 210 and encoding and decoding are presumed to take place without error. If the decoded data fails to match the original data, the process proceeds to step 212 and appropriate action is taken to respond to an encoding or decoding error. Such action may include repeating transmission or other error recovery procedures, noting the existence of an error, or other appropriate action directed to overcoming the error and, if appropriate, taking or directing action to prevent the existence of future errors.

While the present invention is disclosed in the context of a presently preferred embodiment, it will be recognized that a wide variety of implementations may be employed by persons of ordinary skill in the art consistent with the above discussion and the claims which follow below.

We claim:

1. A station for sending data to a receiver, comprising: a data transmission interface for passing data to a communication channel for a transmission;

storage memory connected for communication with a processor and containing a correlation table for receiving information identifying the receiver, for identifying a decoding procedure implemented by the receiver, and for providing, for use in decoding the copy of the encoded data, an identity of the decoding procedure implemented by the receiver;

the processor connected for communication with the data transmission interface, for preparing unencoded data for the transmission, the processor being operative to encode data and pass the encoded data to the data transmission interface, the processor being further operative to decode a copy of the encoded data according to the identified decoding procedure implemented by the receiver, including programming errors and misinterpretations of standards in the decoding procedure implemented by the receiver and to compare the unencoded data with the decoded copy of the encoded data as processed by encoding and decoding, to determine if the transmission is affected by encoding or decoding errors.

2. The station of claim 1, wherein the processor determines whether the transmission is unaffected by encoding or decoding errors by determining whether the unencoded data is identical to the decoded copy of the encoded data.

3. The station of claim 2, wherein the processor is operative to identify a specific implementation of a standard being used by the receiver and to employ the identified standard to decode the copy of the encoded data.

4. The station of claim 3, wherein the processor receives an identifier for the receiver and uses the identifier for the receiver to identify an implementation of the standard being used by the receiver.

5. The station of claim 2, wherein the processor is operative to initiate an error recovery process if the unencoded data does not match the decoded copy of the encoded message.

6. The station of claim 1, wherein the encoding and decoding is performed according to an implementation of the Abstract System Notation One standard.

7. The station of claim 1, wherein the processor, upon detection of a mismatch between the unencoded data and the decoded copy of the encoded message, directs transmission of a report of the presence of an encoding or decoding error to a server for receiving reports of encoding and decoding errors.

8. The station of claim 1, wherein the data is encoded into simple network management protocol data units.

9. A method of preparing data for a transmission from a sender to a receiver, comprising:
controlling a processor to process unencoded data at the sender to create an encoded message for the transmission to the receiver;
identifying a decoding procedure used by the receiver, using information identifying the receiver, from a correlation table;
decoding a copy of the encoded message at the sender according to the identified decoding procedure used by the receiver, including programming errors and misinterpretations of standards in the decoding procedure used by the receiver, to create a decoded copy of the encoded message; and
at the sender, comparing the unencoded data with the decoded copy of the encoded message, to determine if the transmission is affected by encoding or decoding errors.

10. The method of claim 9, wherein the encoded message includes information identifying an encoding standard used and wherein decoding the copy of the encoded message includes identifying the encoding standard and selecting a matching decoding standard for decoding.

11. The method of claim 10, wherein the information identifying the encoding standard includes information identifying the destination receiver.

12. The method of claim 11, further comprising determining that the transmission has been affected by encoding or decoding errors if the unencoded data does not match the decoded copy of the encoded message and directing the performance of error recovery procedures.

13. The method of claim 12, further comprising storing information relating to the error determination for use in refining encoding and decoding standards.

14. The method of claim 13, wherein storing information for use in refining encoding and decoding standards includes transmitting the information for storage by a central authority making information accessible to developers of encoding and decoding standards.

15. The method of claim 9, wherein encoding and decoding are performed according to an implementation of the Abstract System Notation One standard.

16. The method of claim 9, wherein data is encoded into simple network management protocol data units.

17. A memory device storing a software module for execution by a processor at a sender for data communication from the sender to a receiver, comprising:
an encoder module for converting unencoded data to an encoded message;
a transmit module for formatting the encoded message for transmission and passing the message to a communication interface; and
a correlation table for receiving information identifying the receiver, for identifying a decoding procedure used by the receiver, and for providing, for use by the decoder module, an identity of the decoding procedure used by the receiver;
an error detector module for determining if data communication is affected by encoding or decoding, the error detector module comprising:
a decoder module for decoding a copy of the encoded message to produce a decoded copy, the decoder module operating according to the identified decoding procedure used by the receiver, including any programming errors and misinterpretations of standards in the decoding procedure used by the receiver;
a comparison module for comparing the unencoded data and the decoded copy of the encoded message, the comparison module being operative to determine that an encoding or decoding error has occurred if the unencoded data does not match the decoded copy of the encoded message.

18. The memory device of claim 17, wherein the encoder module is operative to include in the message information identifying a decoding standard used by the destination receiver and wherein the error detector module is operative to use the information identifying the decoding standard to operate the decoder module so that the decoding procedure used matches the decoding standard used by the destination receiver.

19. The memory device of claim 18, wherein the information identifying the decoding procedure used by the destination receiver includes identifying information for the destination receiver.

20. The memory device of claim 17, wherein encoding and decoding are performed according to an implementation of the Abstract System Notation One standard.

* * * * *